United States Patent [19]

Saito et al.

[11] Patent Number: 5,462,997

[45] Date of Patent: Oct. 31, 1995

[54] POLYHYDRIC PHENOL, AND EPOXY RESIN AND EPOXY RESIN COMPOSITION DERIVED THEREFROM

[75] Inventors: Noriaki Saito; Takashi Morimoto; Kazuo Takebe; Yutaka Shiomi, all of Tsukuba; Shigeki Naitoh, Tokyo; Shuichi Kanagawa, Tsukuba, all of Japan

[73] Assignee: Sumitomo Chemical Co., Ltd., Osaka, Japan

[21] Appl. No.: 328,771

[22] Filed: Oct. 27, 1994

Related U.S. Application Data

[62] Division of Ser. No. 155,181, Nov. 22, 1993, Pat. No. 5,395,912, which is a continuation of Ser. No. 957,875, Oct. 8, 1992, abandoned.

[30] Foreign Application Priority Data

Oct. 9, 1991 [JP] Japan .................................. 3-261898

[51] Int. Cl.⁶ .......................... C08G 8/36; C08G 59/08; C08L 63/04
[52] U.S. Cl. .................. 525/507; 528/98; 528/153
[58] Field of Search ............................... 525/507; 528/98, 528/153

[56] References Cited

U.S. PATENT DOCUMENTS

| 1,873,849 | 8/1932 | Moss . |
| 2,844,553 | 7/1958 | Taylor et al. . |
| 3,829,401 | 8/1974 | Futaki . |
| 4,550,128 | 10/1985 | Chellis . |

FOREIGN PATENT DOCUMENTS 158915  10/1985  European Pat. Off. .

WO19749 12/1991 WIPO .

OTHER PUBLICATIONS

Erich et al, Effect of Molecular Structure on Mechanical Properties of Epoxy Resins, Journal of Applied Polymer Science III: 296 (1960).

*Primary Examiner*—Robert E. Sellers
*Assistant Examiner*—D. R. Wilson
*Attorney, Agent, or Firm*—Cushman Darby & Cushman

[57] ABSTRACT

An epoxy resin composition contains (a) an epoxy resin represented by the general formula (2)

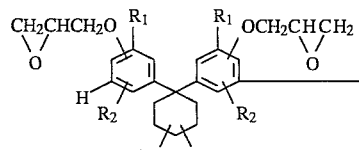

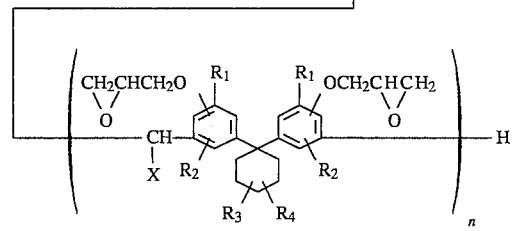

wherein $R_1$ to $R_4$ independently represent hydrogen, an alkyl or cycloalkyl group having 1 to 9 carbon atoms, or halogen, and X represents hydrogen, an alkyl group having 1 to 9 carbon atoms, or an aryl and n represents an average number of repeating units of 0.1 to 1.6; and a curing agent.

11 Claims, No Drawings

POLYHYDRIC PHENOL, AND EPOXY RESIN AND EPOXY RESIN COMPOSITION DERIVED THEREFROM

This is a division of application Ser. No. 08/155,181, filed Nov. 22, 1993, U.S. Pat. No. 5,395,912, which is a continuation of Ser. No. 07/957,875, filed Oct. 8, 1992, now abandoned.

BACKGROUND OF THE INVENTION

1. Field of the Invention

The present invention relates to a novel polyhydric phenol and an epoxy resin and an epoxy resin composition useful for encapsulating electronic devices derived from the polyhydric phenol as starting material.

2. Description of the Related Art

Recently, semiconductors such as LSI, IC, transistors and the like have been encapsulated by transfer molding with epoxy resins which are economically advantageous. Particularly, many of practical package have been recently mounted by surface mounting technology, so that immersion of them directly into a solder bath has been increasingly performed. During the immersion, the encapsulating materials are exposed to high temperatures of 200° C. or more to cause expansion of the moisture which has been hygroscopically sorbed in the encapsulating materials. Therefore, the encapsulating materials become more prone to cracking.

For this reason, the epoxy encapsulating materials are required to have a resistance to cracking, especially much less hygroscopicity than the ordinary level thereof. Currently the most popular encapsulating materials are those using a glycidyl ether of o-cresol novolak, and packaged practically in moisture-proof wraps to be marketed and stored with moisture absorption being inhibited.

The encapsulating materials comprising a major component of glycidyl ether of o-cresol novolak are not only excellent in heat resistance, but also good to some extent in balance of heat resistance and less hygroscopicity. However, they are not necessarily satisfactory in such applications as a greater degree of less hygroscopicity being required as described above. Therefore, there has been desired an improvement of the encapsulating materials.

In addition, for example, cured products from difunctional epoxy resins such as glycidyl ether of bisphenol cyclohexane have an inferior thermal resistance as well as an insufficient curing property though they are excellent in less hygroscopicity.

SUMMARY OF THE INVENTION

It is an object of the present invention to provide an epoxy resin capable of producing a cured product which is excellent in less hygroscopicity and has a balance between the thermal resistance and the curing property, and a polyhydric phenol as starting material for the epoxy resin.

The present invention can be described as follows:

1. A polyhydric phenol represented by the general formula (1):

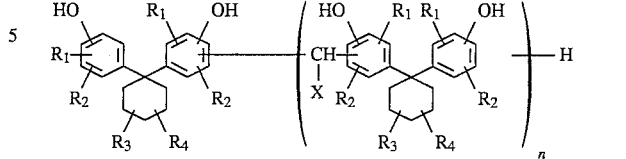

(1)

wherein $R_1$ to $R_4$ independently represent hydrogen, an alkyl or cycloalkyl group having 1 to 9 carbon atoms, or halogen, and X represents hydrogen, an alkyl group having 1 to 9 carbon atoms, or an aryl group, and n represents an average number of repeating units of 0.1 to 10.

2. An epoxy resin represented by the general formula (2):

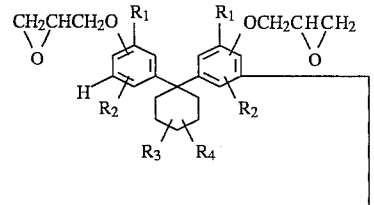

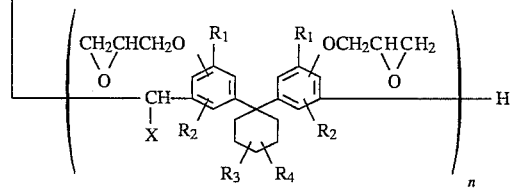

wherein $R_1$ to $R_4$ independently represent hydrogen, an alkyl or cycloalkyl group having 1 to 9 carbon atoms, or halogen, and X represents hydrogen, an alkyl group having 1 to 9 carbon atoms, or an aryl, and n represents an average number of repeating units of 0.1 to 10.

3. An epoxy resin composition comprising said epoxy resin and a curing agent.

4. A process for using the epoxy resin composition for encapsulating a semiconductor device.

DETAILED DESCRIPTION OF PREFERRED EMBODIMENTS

The substituents $R_1$ to $R_4$ contained in the polyhydric phenol represented by the general formula (1) and the epoxy resin represented by the general formula (2) according to the present invention include hydrogen, methyl, ethyl, propyl, butyl, amyl, hexyl, cyclohexyl, heptyl, octyl, nonyl, chlorine, and bromine, including various isomers.

The substituent X includes hydrogen, methyl, ethyl, propyl, butyl, amyl, hexyl, cyclohexyl, heptyl, octyl, nonyl, phenyl, and naphtyl, including various isomers thereof.

The average number of repeating units, n, is 0.1 to 10, preferably 0.1 to 5, more preferably 0.1 to 2. The n higher than 10 results undesirably in poor workability with an increase in viscosity.

Polyhydric phenols according to the present invention can be produced by condensation of a bisphenol represented by the general formula (3):

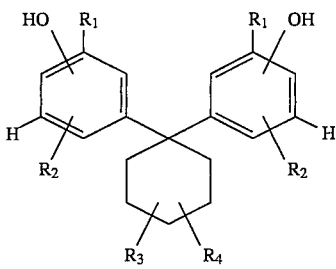

(3)

wherein $R_1$ to $R_4$ are the same as those defined for the general formula (1), and an aldehyde represented by the general formula (4):

(4)

wherein X is the same as that defined for the general formula (1), in the presence of an acidic catalyst.

The polyhydric phenol according to the present invention may be produced by one of known methods comprising condensing an aldehyde as described above with a bisphenol as described above in the presence of an acidic catalyst such as an inorganic acid such as hydrogen chloride and sulfuric acid, an organic acid such as acetic acid, p-toluene sulfonic acid, thioglycollic acid, or a Lewis acid.

The polyhydric phenol according to the present invention is a novel compound, and expected to be useful for applications such as synthesis of epoxy resins and various phenol resins.

Bisphenols used in the present invention may be produced by any one of known methods comprising condensing a cyclohexanone as defined below with a phenol as defined below in a molar ratio of two times or more the molar amount of the cyclohexanone in the presence of an acidic catalyst such as an inorganic acid such as hydrogen chloride and sulfonic acid, an organic acid such as acetic acid, p-toluene sulfonic acid, thioglycollic acid, or a Lewis acid, washing with water, distilling out unreacted phenols, and if necessary, conducting post-treatment such as recrystallization from poor solvent. In the process, phenols may be left in the bisphenols to such an extent as not diminishing the effects of the present invention.

Exemplary phenols include phenol, cresol, ethyl phenol, propyl phenol, butyl phenol, amyl phenol, hexyl phenol, cyclohexyl phenol, octyl phenol, nonyl phenol, xylenol, methylbutyl phenol, chlorophenol, bromophenol, dichlorophenol, and dibromophenol, including various isomers thereof. These phenols may be used as alone as well as in a mixture of two or more thereof.

Exemplary cyclohexanones include cyclohexanone, mono-, or di-alkyl cyclohexanone and the like. The alkyl group includes those having 1 to 9 carbon atoms.

Exemplary aldehydes represented by the general formula (4) to be used in the present invention include formaldehyde, acetaldehyde, butylaldehyde, benzaldehyde, naphthaldehyde, and the like.

Moreover, the said polyhydric phenols may be substituted with halogens such as chlorine and bromine for imparting flame retardance.

The epoxy resin according to the present invention can be produced by glycidyl-etherifying the polyhydric phenol obtained in the procedure as described above, i.e., by a known method comprising reacting the polyhydric phenol with an epihalohydrin in the presence of an alkali such as caustic soda. Particularly, if desired to produce a highly pure product, a reaction in an aprotic solvent is preferred as disclosed in Japanese Patent KOKAI (Laid-open) No. Sho 60-31517.

From the epoxy resin according to the present invention, there can produce a cured product by using an ordinary epoxy curing agent.

Exemplary curing agents include polyhydric phenols such as phenol novolak, amine based curing agents such as dicyandiamide, diaminodiphenylmethane, diaminodiphenylsulfonic acid, acid anhydride based curing agents such as pyromellitic acid anhydride, trimellitic acid anhydride, benzophenonetetracarboxylic acid anhydride, with polyhydric phenols being preferred.

Exemplary polyhydric phenols as curing agents include polycondensates of one or more kinds of phenols such as phenol, alkylphenol, naphtol, or the like with an aldehyde such as formaldehyde, acetaldehyde, acrolein, glyoxal, benzaldehyde, naphtaldehyde, hydroxybenzaldehyde, or the like and/or a ketone such as cyclohexanone, acetophenone, or the like; vinylpolymer type polyhydric phenols such as polyvinylphenol and polyisopropenylphenol; Friedel-Crafts reaction products of a phenol with a diol such as a diol represented by the general formula:

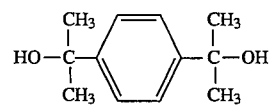

or with a dialkoxide such as a dialkoxide represented by the general formula:

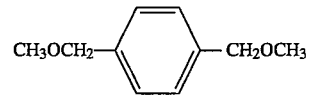

or with a dihalide such as a dihalide represented by the general formula:

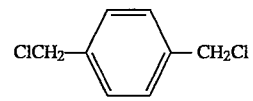

or with a diolefin such as dicyclopentadiene, diisopropenylbenzene or the like.

The amount of these curing agents to be used is 0.7 to 1.2 equivalents based on the epoxy group. An amount of the curing agents of lower than 0.7 equivalent or over 1.2 equivalents based on the epoxy group result in insufficient cure.

Furthermore, to the composition there may be added known additives such as fillers, curing accelerators, flame retardants, mold releasing agents, surface treating agents and the like depending upon the end use.

The fillers include silica, alumina, aluminum hydroxide, talc, clay and glass fibers. These may be used in a mixture of different shapes (sphere or crashed types) and different sizes to increase the filler volume. The curing accelerators include imidazoles, tertiary amines, phosphorus compounds, and the like. The flame retardants include brominated epoxy resins, antimony trioxide, and the like.

The mold releasing agents include waxes, metal salts of higher fatty acids such as zinc stearate, and the surface treating agents include silane coupling agents and the like.

In order to reduce stresses imposed, various elastomers may be added or pre-reacted. Practically, one may make mention of additive or reactive type elastomers such as polybutadiene, butadiene-acrylonitrile copolymer, silicone rubbers, and the like.

With the resin composition of the present invention, electronic parts of semiconductors and the like can be encapsulated by molding and curing according to any one of known prior techniques such as transfer molding, compression molding, injection molding and the like.

Cured products from the epoxy resins of the present invention have a lower hygroscopic property compared to the conventional products and a balance between the thermal resistance and the curing property so that they are highly suitable for practical use particularly as encapsulating materials for electronic devices. The polyhydric phenols according to the present invention are important as starting material for epoxy resins.

The present invention will be illustrated with reference to the following Examples, without being limited thereto. In Examples, epoxy equivalent weight is defined as a molecular weight of an epoxy resin per epoxy group. Hydrolyzable chlorine content was determined by dissolving an epoxy resin into dioxane, adding a solution of potassium hydroxide in alcohol, heating the solution at reflux for 30 minutes to release chloride ions, the amount of which was back titrated with an aqueous solution of silver nitrate to be expressed in terms of parts per million of said epoxy resin. The average number of repeating units was determined with GPC (TRIROTOR SR-II, available from NIPPON BUNKO KOGYO, Ltd.

Cured materials were evaluated as follows:

Glass transition temperature: Determination was effected using a thermomechanical analyzer (SHIMADZU DT-30).

Barcol hardness: Determination was made with a hard tester model 935 according to ASTM D-648.

Flexural strength, flexural modulus: Determination was made with an Instron universal tester (SHIMADZU IS-10T) according to JIS K-6911.

Water absorbance: A variation in weight was measured at a temperature of 85° C. and a relative humidity of 85% using a thermostat (TABAI PR-2) under a constant humidity.

Spiral flow: Conducted at a temperature of 175° C. and at 70 kg/cm$^2$.

Referential Example 147.3 g of cyclohexanone were added to a reactor equipped with a thermometer, a stirrer, and a condenser, dissolved into 648.6 g of o-cresol, added with 600 g of concentrated hydrochloric acid, and stirred at 60° C. for 10 hours.

After the reaction was completed, toluene was added to produce a precipitate containing a condensate of o-cresol with cyclohexanone, and the precipitate was separated by filtration. The obtained precipitate was washed with water to remove hydrochloric acid, thereby giving bis-o-cresol cyclohexane.

FD-MASS spectroscopy indicated that the product had a molecular weight of 296 and a melting point of 190° to 195° C.

1. Synthesis of polyhydric phenols

Example 1

To a reactor equipped with a thermometer, a stirrer, and a condenser, 100 g of bis-o-cresolcyclohexane, 1.92 g of p-toluene sulfonic acid monohydrate and 150 g of methylisobutylketone were added, and after dissolved, 8.15 g of a 37% formalin were continuously added dropwise at a temperature of 80° C. for 2 hours, and then the whole was kept at a temperature of 80° C. for 2 hours as it was. After neutralizing with caustic soda, washing with water, and concentrating under reduced pressure, bis-o-cresolcyclohexane novolak was obtained.

By FD-MASS spectroscopy, fragments of 296, 604, 912, and 1220 were detected. The average number of repeating units, n, determined by GPC was 0.68.

Example 2

To a reactor equipped with a thermometer, a stirrer, and a condenser, 100 g of bisphenolcyclohexane (available from SUMITOMO Chemical Co., Ltd., under the trade name of Antigen W), 1.92 g of p-toluene sulfonic acid monohydrate and 150 g of methylisobutylketone were added, and after dissolved, 8.15 g of a 37% formalin were continuously added dropwise at a temperature of 80° C. for 2 hours, and then the whole was kept at a temperature of 80° C. for 2 hours as it was. After neutralizing with caustic soda, washing with water, and concentrating under reduced pressure, bisphenolcyclohexane novolak was obtained.

By FD-MASS spectroscopy, fragments of 268, 548, and 828 were detected. The average number of repeating units, n, determined by GPC was 0.53.

Example 3

To a reactor equipped with a thermometer, a stirrer, and a condenser having a water separator, 160.8 g of bisphenolcyclohexane, 3.42 g of p-toluene sulfonic acid monohydrate, 160.8 g of isoamylalcohol and 19.1 g of benzaldehyde were added. After dissolved, the solution was distilled under reduced pressure of 70 torr at a temperature of 80° C. to distill out isoamylalcohol and water which were cooled into liquid. While returning the organic layer into the reactor, the reaction was conducted for 4 hours. After neutralizing with caustic soda, washing with water, and concentrating under reduced pressure, bisphenolcyclohexane benzaldehyde condensate was obtained.

By FD-MASS spectroscopy, fragments of 268, 624, 980, and 1336 were detected. The average number of repeating units, n, determined by GPC was 1.56.

Example 4

Using 100 g of bisphenolcyclohexane, 2.31 g of p-toluene sulfonic acid monohydrate, 150 g isoamylalcohol and 17.5 g of naphthaldehyde, bisphenolcyclohexane naphthaldehyde condensate was obtained in the same manner as in Example 3.

By FD-MASS spectroscopy, fragments of 268, 674, and 1080 were detected. The average number of repeating units, n, determined by GPC was 0.67.

2. Synthesis of epoxy resins

Example 5

To a reactor equipped with a thermometer, a stirrer, and a condenser having a water separator, 150 g of bis-o-cresolcyclohexane novolak obtained in Example 1 were added, and dissolved in 647.6 g of epichlorohydrin and 323.8 g of dimethyl sulfoxide. The solution was added with 8.8 g of a 48.6% caustic soda while maintaining the temperature at 40° C. and further warmed at that temperature for 6 hours. To the reaction phase kept under a pressure of 41 torr, 69.4 g of a 48.6% caustic soda were continuously added dropwise at a temperature of 48° C. for 4 hours. During the addition, the temperature was kept at 48° C. with azeotropically distilled epichlorohydrin and water being cooled to liquid. While returning the organic layer into the reactor, the reaction was conducted for 4 hours.

After the reaction was completed, unreacted epichlorohydrin was removed out by concentration under reduced pressure, and a glycidyl ether containing by-product salt and dimethyl sulfoxide was dissolved into methylisobutylketone and washed with water to remove out the by-product salt and dimethyl sulfoxide.

The thus obtained glycidyl ether had an epoxy equivalent weight of 227 g/eq. and a hydrolyzable chlorine content of 280 ppm.

Example 6

A glycidyl ether was produced in the same manner as in Example 5, except that 136 g of bisphenolcyclohexane novolak obtained in Example 2 were used. The produced glycidyl ether had an epoxy equivalent weight of 208 g and a hydrolyzable chlorine content of 200 ppm.

Example 7

A glycidyl ether was produced in the same manner as in Example 5, except that 136 g of bisphenolcyclhexane benzaldehyde condensate obtained in Example 3 were used. The produced glycidyl ether had an epoxy equivalent weight of 226 g/eq. and a hydrolyzable chlorine content of 220 ppm.

Example 8

A glycidyl ether was produced in the same manner as in Example 5, except that 136 g of bisphenolcyclohexane naphthaldehyde condensate obtained in Example 4 were used. The produced glycidyl ether had an epoxy equivalent weight of 228 g/eq. and a hydrolyzable chlorine content of 260 ppm.

Comparative Example 1

500 g of 2,6-xylenol were treated in the identical procedure to that disclosed in Example 1 of Japanese Patent KOKAI (Laid-open) No. Hei 1-283241 to produce 3,3',5,5'-tetramethylbiphenol.

A glycidyl ether was produced in the same manner as in Example 5, except that 121 g of 3,3',5,5'-tetramethylbiphenol were used. The produced glycidyl ether had an epoxy equivalent weight of 194 g/eq. and a hydrolyzable chlorine content of 220 ppm.

Comparative Example 2

A glycidyl ether was produced in the same manner as in Example 5, except that 134 g of bisphenolcyclhexane were used. The produced glycidyl ether had an epoxy equivalent weight of 201 g/eq. and a hydrolyzable chlorine content of 330 ppm.

3. Evaluation of the composition and the cured materials

Examples 9 to 12 and Comparative Examples 3 to 5

The epoxy resins obtained in the above Examples, a phenol novolak as curing agent (available from ARAKAWA Chemical Industry Co. Ltd. under the trade name of TAMANOL 759), triphenyl phosphine as curing accelerator, fused silica as filler (available from Electric Chemical Industry Co. Ltd. under the trade name of FS-891), carnauba wax as mold releasing agent, a coupling agent (available from TORE DOW CORNING SILICONE under the trade name of SH-6040) were incorporated in amounts (g) as indicated in Table 1, heat-kneaded with a roll, and transfer molded. Then, the moldings were post-cured for 5 hours in an oven at a temperature of 180° C. to produce cured materials.

The compositions were measured for spiral flow and the cured materials for glass transition temperature, water absorbance (a measure of hygroscopicity), flexural strength, flexural modulus. The results are set forth in Table 2.

TABLE 1

|  | Ex. 9 | Ex. 10 | Ex. 11 | Ex. 12 | Comp. Ex. 3 | Comp. Ex. 4 | Comp. Ex. 5 |
| --- | --- | --- | --- | --- | --- | --- | --- |
| Glycidyl ether | Ex. 5 | Ex. 6 | Ex. 7 | Ex. 8 | Note 1 | Comp. Ex. 1 | Comp. Ex. 2 |
| Amount | 100 | 100 | 100 | 100 | 100 | 100 | 100 |
| Phenol novolak | 48.5 | 52.9 | 48.9 | 48.2 | 56.0 | 56.7 | 54.7 |
| Triphenyl phosphine | 1.5 | 1.5 | 1.5 | 1.5 | 1.5 | 1.5 | 1.5 |
| Filler | 347 | 357 | 347 | 346 | 364 | 366 | 361 |
| Mold releasing agent | 1.5 | 1.5 | 1.5 | 1.5 | 1.5 | 1.5 | 1.5 |
| Coupling agent | 2.0 | 2.0 | 2.0 | 2.0 | 2.0 | 2.0 | 2.0 |

Note 1: glycidyl ether of o-cresol novolak; SUMI-EPOXY ® ESCN-195 available from SUMITOMO Chemical Co. Ltd. (Epoxy equivalent weight; 201 g/eq., Hydrolyzable chlorine content; 330 ppm)

TABLE 2

|  | Ex. 9 | Ex. 10 | Ex. 11 | Ex. 12 | Comp. Ex. 3 | Comp. Ex. 4 | Comp. Ex. 5 |
| --- | --- | --- | --- | --- | --- | --- | --- |
| Spiral flow (in) | 65 | 60 | 60 | 52 | 53 | 48 | 57 |
| Barcol hardness (B) | 61 | 75 | 71 | 80 | 78 | 50 | 0 |
| Glass transition | 145 | 166 | 163 | 152 | 168 | 130 | 110 |

TABLE 2-continued

|  | Ex. 9 | Ex. 10 | Ex. 11 | Ex. 12 | Comp. Ex. 3 | Comp. Ex. 4 | Comp. Ex. 5 |
|---|---|---|---|---|---|---|---|
| temp. (°C.) | | | | | | | |
| Flexural strength (kg/mm$^2$) | 14 | 14 | 13 | 13 | 13 | 14 | 14 |
| Flexural modulus (kg/mm$^2$) | 1460 | 1370 | 1350 | 1370 | 1350 | 1360 | 1420 |
| % Water absorbance | | | | | | | |
| 24 hrs. | 0.13 | 0.15 | 0.15 | 0.14 | 0.25 | 0.20 | 0.15 |
| 72 hrs. | 0.23 | 0.28 | 0.27 | 0.27 | 0.37 | 0.33 | 0.27 |

What is claimed is:

1. An epoxy resin composition comprising (a) an epoxy resin represented by the general formula (2)

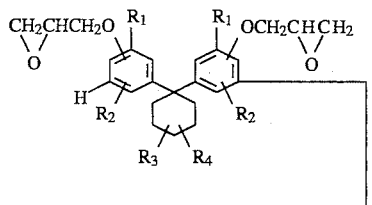
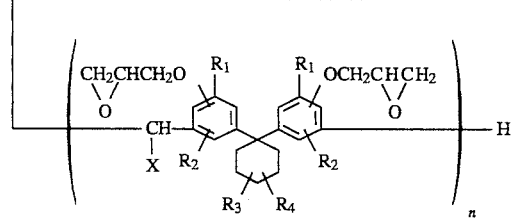

wherein $R_1$ to $R_4$ independently represent hydrogen, an alkyl or cycloalkyl group having 1 to 9 carbon atoms, or halogen, and X represents hydrogen, an alkyl group having 1 to 9 carbon atoms, or an aryl and n represents an average number of repeating units of 0.1 to 1.6; and a curing agent.

2. The epoxy resin composition according to claim 1, in which said curing agent is a polyhydric phenol.

3. An epoxy resin composition according to claim 1, wherein said epoxy resin (a) is produced by reacting a polyhydric phenol with an epihalohydrin, and said polyhydric phenol is obtained by condensation of a bisphenol represented by the general formula (3)

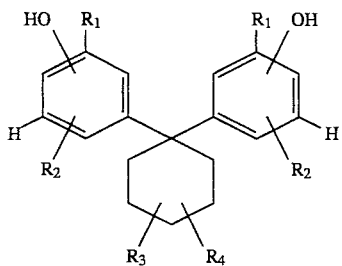 (3)

wherein $R_1$ to $R_4$ are the same as those defined for the general formula (2), and an aldehyde represented by the general formula (4):

wherein X is the same as that defined for the general formula (2).

4. An epoxy resin composition according to claim 1, wherein said curing agent is present in an amount of 0.7 to 1.2 equivalents based on the epoxy group.

5. An epoxy resin composition according to claim 1, wherein said curing agent is present in an amount of 0.7 to 1.2 equivalents based on the epoxy group, X is selected from the group consisting of hydrogen, methyl, ethyl, propyl, butyl, amyl, hexyl, cyclohexyl, heptyl, octyl, nonyl, phenyl and naphtyl, and $R_1$, $R_2$, $R_3$, and $R_4$ are each independently selected from the group consisting of hydrogen, methyl, ethyl, propyl, butyl, amyl, hexyl, cyclohexyl, heptyl, octyl, nonyl, chlorine, and bromine.

6. An epoxy resin composition according to claim 1, wherein X is selected from the group consisting of hydrogen, methyl, ethyl, propyl, butyl, amyl, hexyl, cyclohexyl, heptyl, octyl, nonyl, phenyl and naphtyl.

7. An epoxy resin composition according to claim 3, wherein X is selected from the group consisting of hydrogen, methyl, ethyl, propyl, butyl, amyl, hexyl, cyclohexyl, heptyl, octyl, nonyl, phenyl and naphtyl.

8. An epoxy resin composition according to claim 1, wherein $R_1$, $R_2$, $R_3$, and $R_4$ are each independently selected from the group consisting of hydrogen, methyl, ethyl, propyl, butyl, amyl, hexyl, cyclohexyl, heptyl, octyl, nonyl, chlorine, and bromine.

9. An epoxy resin composition according to claim 3, wherein $R_1$, $R_2$, $R_3$, and $R_4$ are each independently selected from the group consisting of hydrogen, methyl, ethyl, propyl, butyl, amyl, hexyl, cyclohexyl, heptyl, octyl, nonyl, chlorine, and bromine.

10. An epoxy resin composition according to claim 6, wherein $R_1$, $R_2$, $R_3$, and $R_4$ are each independently selected from the group consisting of hydrogen, methyl, ethyl, propyl, butyl, amyl, hexyl, cyclohexyl, heptyl, octyl, nonyl, chlorine, and bromine.

11. An epoxy resin composition according to claim 7, wherein $R_1$, $R_2$, $R_3$, and $R_4$ are each independently selected from the group consisting of hydrogen, methyl, ethyl, propyl, butyl, amyl, hexyl, cyclohexyl, heptyl, octyl, nonyl, chlorine, and bromine.

* * * * *